Dec. 11, 1928.

F. H. DUKESMITH 1,695,245

AIR BRAKE SYSTEM

Filed May 2, 1927

4 Sheets-Sheet 1

Fig.1.

Fig.13. Quick Release
Fig.14. Running
Fig.15. Lap
Fig.16. Application

Inventor
Frank H. Dukesmith
By Popp & Powers
Attys.

Dec. 11, 1928.
F. H. DUKESMITH
1,695,245
AIR BRAKE SYSTEM
Filed May 2, 1927
4 Sheets-Sheet 2
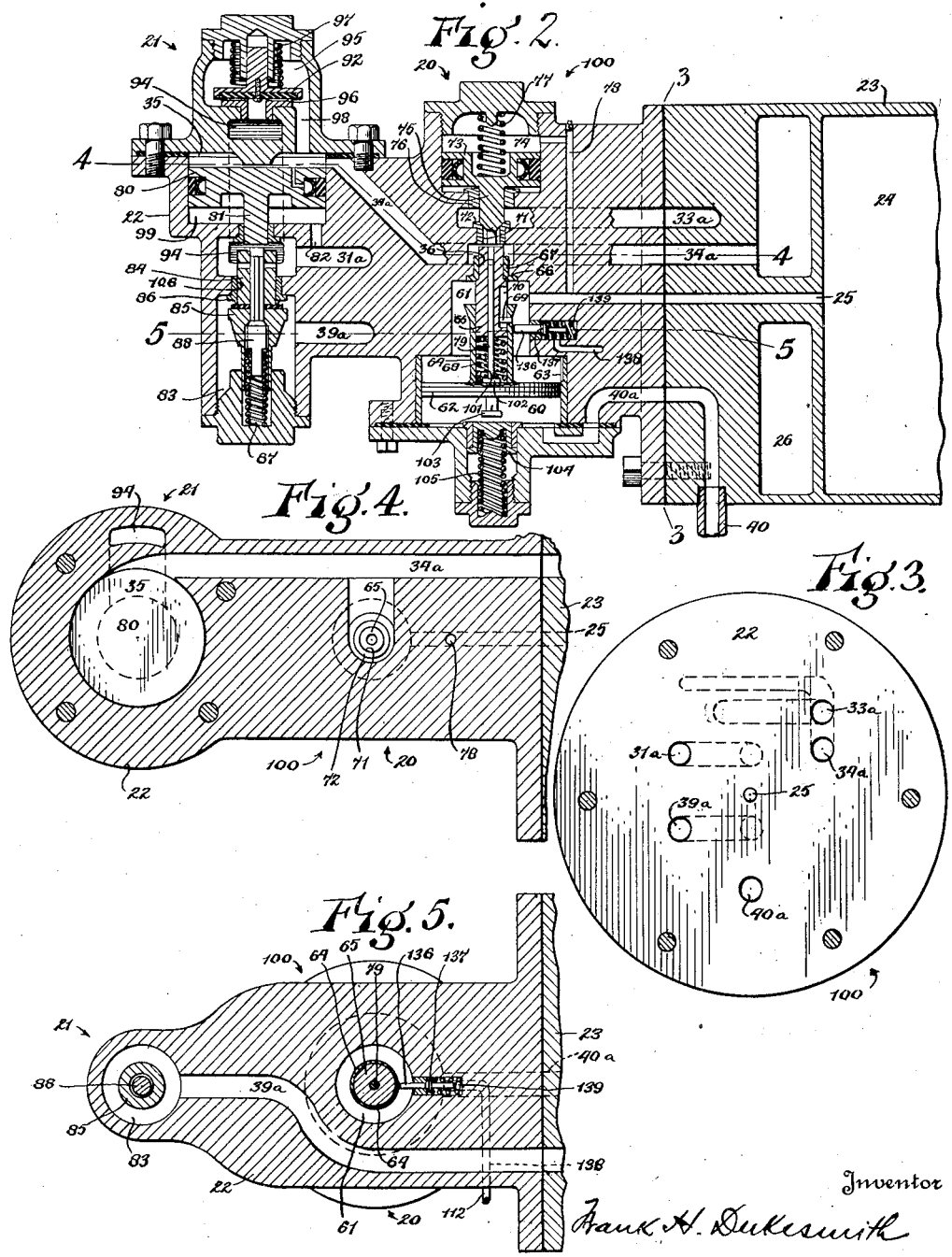
Inventor
Frank H. Dukesmith
By Pople & Powers
Attorneys Dec. 11, 1928.  
F. H. DUKESMITH  
1,695,245  
AIR BRAKE SYSTEM  
Filed May 2, 1927  
4 Sheets-Sheet 3
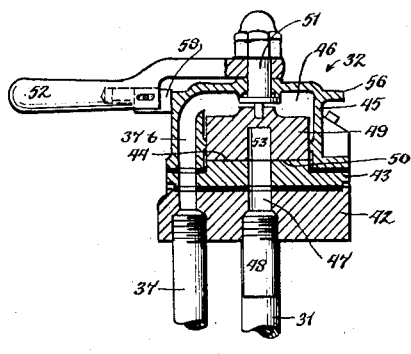
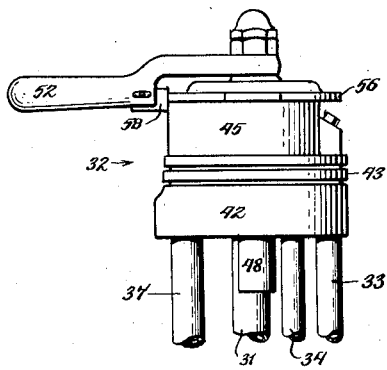
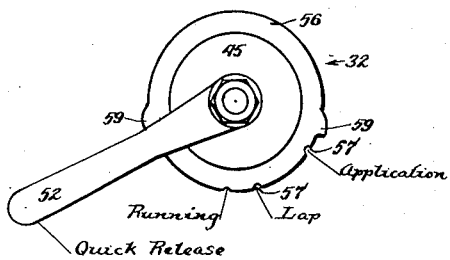
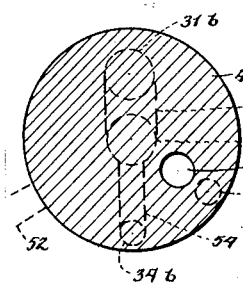
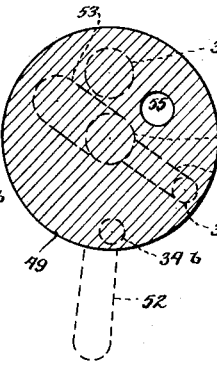
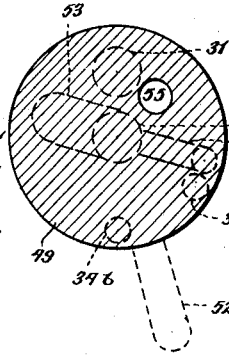
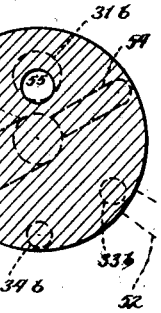

Dec. 11, 1928.
F. H. DUKESMITH
AIR BRAKE SYSTEM
Filed May 2, 1927
1,695,245
4 Sheets-Sheet 4
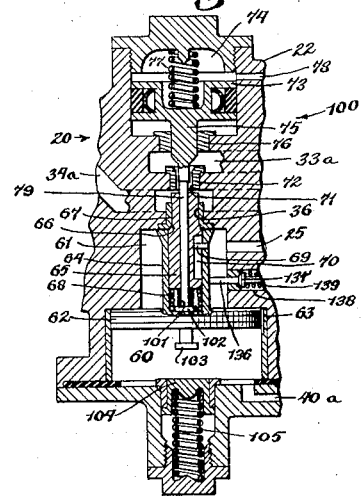
Fig. 17.
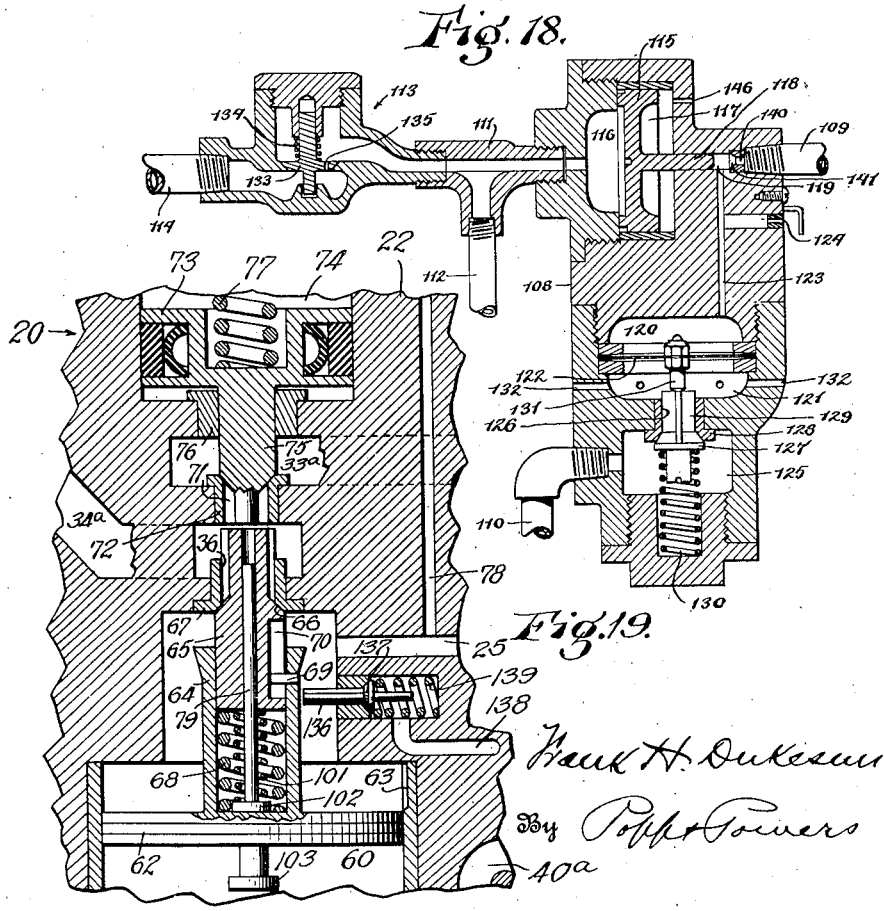
Fig. 18.
Fig. 19.
Inventor
Frank H. Dukesmith
By Poff & Powers
Attorneys Patented Dec. 11, 1928.

1,695,245

UNITED STATES PATENT OFFICE.

FRANK H. DUKESMITH, OF MEADVILLE, PENNSYLVANIA, ASSIGNOR, BY MESNE ASSIGNMENTS, TO FREDERICK C. BORST AND FLOYD R. STEWART.

AIR-BRAKE SYSTEM.

Application filed May 2, 1927. Serial No. 188,333.

This invention relates to fluid pressure brakes and more particularly to air brake equipment used on railroad locomotives and other railroad vehicles by which the engineman is enabled to control the locomotive and train brakes alternately or in unison.

The principal object of the present invention is to provide an air brake system for railroad locomotives wherein the engineman is not only given complete alternate control of both his engine and train brakes, but also has absolute independent control of the locomotive brakes under all conditions of service, these features being of the highest importance in the safe and economical handling of railroad trains.

A further object is to provide a locomotive brake equipment so designed that the exhaust of locomotive brake cylinder pressure is at at all times under the direct manual control of the engineman, thereby giving him more positive and accurate control than is possible with equipment now in common use.

A further object is to provide such a locomotive brake system that will operate in conjunction with trains that are equipped with any of the standard brake systems that are now in common use, and secure all the advantages of alternate and independent control of the train and engine brakes when so used.

A further object is to provide an alternate control locomotive brake equipment in which fluid pressure may be delivered directly from the independent brake valve to the brake cylinders on the locomotive and also to the brake cylinder pressure maintaining portion of the automatic distributing valve.

A further aim is to provide such a locomotive brake system wherein when an independent application of the brakes is made, the air passes directly from the independent brake valve to the brake cylinders without first having to operate an automatic control or distributing valve. This feature permits long trains to be handled with less shock or jar to the cars and freight and thereby results in a reduction in the loss and damage of the rolling stock and of the goods in transit.

A further feature of the present invention is the provision of a distributing valve which does not require the use of slide valves in either the equalizing portion or in the application and maintaining portion of the same, thereby rendering the same more sensitive and positive in its operation and very much easier to maintain in good working condition as well as being less costly to construct.

Another object is the elimination of double check valves in the pipe lines, with the consequent advantage that the locomotive brake cylinder pressure will be automatically maintained regardless of whether or not the brakes are applied by either the independent or automatic brake valve.

A still further aim is to provide such locomotive brake equipment by which the engineman can almost instantly release the brakes on the engine and tender when conditions demand, thereby enabling the engineman at all times to prevent the driving wheel tires from becoming loosened or flattened, and enabling him to reduce to a minimum the costly danger of having the train "buckle" when an air hose bursts or the brake pipe is broken. By the provision of means for quickly releasing the engine and tender brakes before the cars can ram up against the engine, the engineman can almost instantly release the locomotive brakes and thereby keep the engine rolling and the train stretched. This independent quick release of the engine and tender brakes also enables a yard crew to switch cars with greater rapidity than with standard air brake equipment, because when the engineman receives the signal from the switchman to "come ahead", he can instantly release the brakes and allow the engine to roll ahead without having to use steam to keep the engine moving. By this means the switchman can make a much greater number of "cuts" before the engineman has to reverse his engine because of getting too close to the switch point to make the "kick-off" of the cars.

Another purpose is to house all of the automatic mechanism of the distributing valve in one casing and to so design the independent brake valve and the automatic distributing valve that they can be removed without having to break any of the pipe connections, thereby expediting repairs and replacements and avoiding the serious danger of getting the pipes crossed accidentally.

Another object is to provide a locomotive air brake equipment incorporating as one of its features a tire protecting valve mechanism for the purpose of preventing undesired applications of the locomotive brakes.

Further objects are to provide such equipment which is compact, simple and inexpensive in construction, reliable and positive in operation and can be operated by any locomotive engineman without special instruction.

In the accompanying drawings:

Figure 1 shows a pipe arrangement of a locomotive brake system embodying my improvements and showing in outline how a standard engineer's automatic brake valve is connected with my improved independent brake valve and my improved distributing valve and my tire protecting valve. Figure 2 is a vertical longitudinal section through the distributing valve and the double chamber reservoir used in conjunction with my improved distributing valve. Figure 3 is an end view of the distributing valve showing the outlets of the passages therein. Figures 4 and 5 are horizontal longitudinal sections of the distributing valve taken on the correspondingly numbered lines in Fig. 2. Figure 6 is a side elevation of the independent brake valve. Figure 7 is a vertical cross section of the same. Figure 8 is a top plan view of the independent brake valve. Figure 9 is a horizontal sectional view of the rotary valve employed in the independent brake valve showing the supply port through the rotary valve and showing the exhaust cavity in the face and the ports in the seat thereof in dotted lines, said valve being shown in its quick release postion. Figures 10, 11 and 12 are similar views, Fig. 10 showing the valve in its running position, Fig. 11 in its lap position, and Fig. 12 in its application position. Figs. 13, 14, 15 and 16 are horizontal sections through the rotary valve looking downwardly, the valve being shown in its release, running, lap and application positions, respectively. Figure 17 is a fragmentary view of the equalizing portion of the distributing valve in which the valve mechanism is shown in its release and charging position. Figure 18 is a longitudinal sectional view of the tire protecting valve and the check valve used in conjunction therewith. Figure 19 is an enlarged fragmentary vertical longitudinal section of the equalizing valve mechanism shown in Fig. 2.

Similar reference numerals refer to like parts in each of the several views.

The apparatus illustrated in Fig. 1 of the drawings comprises a standard type of an engineer's automatic brake valve 10, such as have been in use for many years, which valve is connected by a branch brake pipe 11 with the main brake pipe 12 and by a pipe 13 with the main reservoir 14, the pressure in this reservoir being suppiled and maintained by an air pump 15. The engineer's automatic brake valve mechanism is provided with the usual gage pipes 16 which are connected with a gage 17, and the brake valve is also connected by a pipe 18 with an equalizing reservoir 19. This brake valve is operated by a handle 20, which upon being moved to application position causes the pressure in the brake pipe 12 to be reduced, thereby causing the brakes on the locomotive and the train to be applied in unison, according to the usual air brake practice.

The automatic distributing valve 100 includes two valve portions as shown in Fig. 1, the construction being shown in Fig. 2, one, indicated at 20, functioning as an equalizing valve, and the other valve mechanism, indicated at 21, being the application and maintaining portion. These automatic valve mechanisms are arranged in a housing 22 which is bolted to a divided reservoir 23. This divided reservoir has a pressure chamber 24 which communicates through a passage 25 with the equalizing valve mechanism 20, and a control chamber 26 which communicates through a passage 34$^a$ with the application portion 21 of the distributing valve. The valve portions 20 and 21 are connected to the other elements of the brake system by passages formed in the valve housing 22 extending to the face thereof, shown in Fig. 3, which face is bolted against the double chamber reservoir. Similar passages are formed in a pipe manifold of the double chamber reservoir and all piping connections but one are made with these last named passages. By this means the piping connections are made on the divided reservoir, and in the event that repairs or adjustments to the automatic distributing valve mechanism are required, the casing 22 can be removed as a unit from the divided reservoir without disturbing any pipe connections and creating the danger of having the pipes connected in wrong order upon re-assembling the system.

The numeral 28 represents a pair of driver or locomotive brake cylinders and 29 the tender brake cylinder, air pressure to these cylinders for applying the engine and tender brakes being supplied through a branch pipe 30 which is connected with the brake cylinder pipe 31. One end of this brake cylinder pipe 31 is connected to the divided reservoir 23 and communicates with a brake cylinder passage 31$^a$, as shown in Figs. 2 and 3, said passage leading to the application and maintaining portion 21 of the distributing valve, and at its other end this brake cylinder pipe 31 communicates with a port 31$^b$ in the independent brake valve 32. In a similar manner an automatic exhaust pipe 33 connects the independent brake valve 32 with the equalizing valve mechanism 20, this pipe communicating with the independent brake valve through a port 33$^b$ and with the equalizing valve mechanism through a passage 33$^a$. Similarly a pipe 34 is connected at one end to a port 34$^b$ in the independent brake valve, and at its other end with the passage 34$^a$ which extends into the divided reservoir casing 23 and the automatic distributing valve housing 22 and communicates with the application chamber 35 of the application valve mechanism 21 and the supply port 36 of the equalizing valve 20. The passage 34ª also communicates with the control chamber 26 of the double chamber reservoir.

The equalizing portion 20 of the distributing valve is also connected to the brake pipe 12 by a branch pipe 40 which communicates with a passage 40ª leading to the brake pipe chamber 60 of this valve mechanism.

Main reservoir air pressure is supplied to the upper chamber of the independent brake valve mechanism through a branch pipe 37 connected at one end to the main reservoir line 13 and at its other end communicates with the passage 37ᵇ in the independent brake valve housing. To provide a reduced pressure in the independent brake valve, a reducing valve 38 is provided in the branch pipe 37, this reducing valve being preferably set at between 40 and 50 pounds pressure.

Main reservoir air pressure is conducted from the reservoir line 13 through a branch pipe 39 to the passage 39ª, which communicates with the supply valve chamber of the application portion of the distributing valve.

The usual manually operated cut-out valves 41 are provided in the system at suitable places.

Referring to Figs. 7–12, the independent brake valve mechanism comprises a body composed of a bottom section 42 forming a pipe manifold, an intermediate section 43 having an upper flat seat 44, and an upper or cover section 45, formed to provide a rotary valve chamber 46, these sections being secured together in any suitable manner. The lower sections 42 and 43 are formed to provide a central exhaust passage 47 which is constantly open to the atmosphere through an exhaust nipple 48, and the upper part of the rotary valve chamber 46 is constantly under reduced main reservoir pressure, this pressure being supplied from the main reservoir line 13 through the branch pipe 37, reducing valve 38 and passage 37ᵇ provided in the valve casing. Within the rotary valve chamber 46 is arranged a rotary valve 49 which engages its underside or face 50 with the seat 44 of the intermediate section 43. This rotary valve is provided with a stem 51 which is journaled in the top of the cover section 45 and is turned by a handle 52 attached to this stem outside of the valve body as best shown in Figs. 6 and 7. On its underside, this rotary valve is provided with a large radially extending exhaust cavity 53 the inner end of which is constantly in communication with the atmosphere through the exhaust passage 47, and this valve is also provided with a small exhaust cavity 54 which extends in a diametrically opposite direction to said large exhaust cavity, the inner end of which small cavity is open to the main exhaust 47. This valve is also formed to provide a supply port or passage 55 which extends vertically through the valve and is adapted in the extreme right hand or application position of the valve as shown in Figs. 16 and 12 to register with the port 31ᵇ, in the seat 44, which permits reduced main reservoir pressure to pass through the independent brake valve and into the brake cylinder pipes 31 and 30 and thence directly to the driver and tender brake cylinders 28 and 29, thereby applying these brakes. Upon moving the handle to the left, as shown in Fig. 11, the rotary valve next assumes a lap position in which its supply port 55 and exhaust cavities are wholly out of register with the ports in the seat of the valve as shown in Figs. 11 and 15. Further movement of the handle to the left brings the rotary valve to its running position shown in Figs. 10 and 14. In this position the smaller exhaust cavity 54 of the rotary valve is in register at one end with the port 33ᵇ and at its other end with the exhaust 47, thereby exhausting the pipe 33 and functioning through the automatic distributing valve to exhaust the pressure from the driver and tender brake cylinders when making an automatic release of the locomotive brakes in a manner hereinafter described. Further turning of the handle 52 to the left moves it to its left extreme or quick-release position. In this position, the large exhaust cavity 53 in the rotary valve registers with the large port 31ᵇ which permits the compressed air in the driver and tender brake cylinders to be directly exhausted through the pipes 30 and 31, port 31ᵇ, the exhaust cavity 53 and exhaust port 47 of the rotary valve seat. At the same time the small exhaust cavity 54 of the rotary valve registers with the port 34ᵇ, thereby exhausting the pipe 34 which exhausts, through the passage 34ª, the application chamber 35 and prevents the application piston from operating the supply valve in a manner hereinafter described. It will be noted that in the quick release position of the independent brake valve, the air is exhausted directly from the brake cylinders through a port having many times the size of the automatic exhaust outlet as used in standard air brake systems and the valve is thereby correspondingly effective in providing for a virtual instantaneous release of the brakes when occasion demands. To indicate to the engineman the four different positions of the rotary valve, a rim 56 is formed on the upper section 45 of the valve casing, and notches 57 are provided in this rim and are engaged by a dog 58 provided in the handle, these notches being spaced to conform to the positions of the valve. Stop projections 59 are also provided in this rim to limit the movement of the valve in either direction.

The equalizing portion 20 of the distributing valve 100 arranged in the housing 22 is constructed as follows:

The numeral 60 represents a brake pipe chamber, and the number 61 represents the pressure reservoir chamber which is on the opposite side of the equalizing piston 62. The lower end of the brake pipe chamber 60 is constantly in communication with the brake pipe 12 through the branch pipe 40 and the passage 40$^a$, and at its upper end this chamber is provided with a feed groove 63. The pressure reservoir chamber 61 is constantly in communication with the pressure reservoir 24 of the double chamber reservoir through the passage 25, and at its upper end this pressure reservoir chamber is provided with a supply port 36.

On the upper side of the piston 62 the same is provided with an open ended cylindrical stem 64 within which is movably arranged a supply valve 65 having a conical face 66 at its outer end which is adapted to engage a seating member 67 provided in the port 36. This valve 65 is yieldingly held in its outermost position relative to the piston stem 64 by a spring 68 arranged within the stem, and the outward movement of this valve relative to the piston stem is limited by a pin 69 which engages a longitudinal groove 70 provided in this valve.

Between the automatic exhaust passage 33$^a$ and the application chamber passage 34$^a$ an automatic exhaust port 71 is provided within which is arranged a valve seating member 72. This port is closed by a valve which comprises an exhaust piston 73 arranged in an exhaust piston chamber 74 above the automatic exhaust passage 33$^a$, this piston having a valve stem 75 which movably extends through a bushing 76 and is adapted to engage the valve seating member 72. This exhaust piston is yieldingly held in its lower position in which its valve stem engages the valve seating member 72 and closes the exhaust port 71, by a spring 77 in the exhaust piston chamber. To equalize the pressures in the reservoir pressure chamber 61 and the exhaust piston chamber 74, and thereby at all times ensure the proper operation of the exhaust piston, an equalizing passage 78 is provided in the valve housing, one end of this passage communicating with the exhaust piston chamber 74 and the other end communicating with the pressure reservoir passage 25, this latter passage being in constant communication with the pressure chamber 61 and pressure reservoir 24. To open this valve 75 when the equalizing piston 62 is in its fully raised position, a plunger 79 is movably arranged in a guideway provided in the valve 65, this plunger being normally held in its retracted position by a helical spring 101 which surrounds this plunger within the piston stem 64 and is interposed between the valve 65 and a head 102 provided at the lower or inner end of this plunger. On the under side of the equalizing piston 62, a buffer 103 is provided, which is adapted in the lower position of the piston to engage a cap 104 in the floor of the brake pipe chamber 60, this cap being yieldingly held in its uppermost position by a graduating spring 105 arranged thereunder.

The application and maintaining portion of the automatic distributing valve shown in Fig. 2 includes an application piston 80 which reciprocates in a cylinder 35, 99$^a$ and is provided with a stem 81 extending through the lower head of the cylinder, and actuates two supply valves 85 and 88 which serve to admit main reservoir pressure to the brake cylinders on the locomotive.

The brake cylinder passage 31$^a$ extends underneath the application piston 80 and is in constant communication with the underside of this piston through a passage 82. Below the end of the passage 31$^a$ the housing is formed to provide a lower main reservoir pressure chamber 83 which is constantly supplied with main reservoir pressure through the passage 39$^a$, pipe 39 and main reservoir pipe 13.

Between the chamber 83 and the brake cylinder passage 31$^a$ a port 106 is provided, the flow of pressure through which is controlled by a supply valve having a channeled guide stem 84 and a head 85 which is yieldingly held against a seating member 86 by a spring 87. Within the supply valve 85 there is a preliminary supply valve 88, the channeled stem of which extends upwardly through the stem 84 of the supply valve 85. The upper end of the spring 87 which holds the supply valve 85 to its seat bears directly against the under side of the preliminary supply valve 88 and thereby operates to seat that valve in turn hold the main supply valve 85 to its seat.

The brake cylinder passage 31$^a$ also is in constant communication with the under side of an upper check valve 92, having a large seating area, through a passage 94 which extends around the side of the piston chamber 35, 99. This upper check valve is arranged in a check valve chamber 95 and is yieldingly held against its seat 96 by a spring 97. This upper check valve chamber 95 communicates with the application chamber 35 through a passage 98.

*Charging and release position of the distributing valve.*

Brake pipe pressure enters the lower brake pipe chamber 60 of the equalizing portion of the automatic distributing valve from the brake pipe 12 through the pipe 40 and passage 40$^a$, forces the equalizing piston 62 to its upper or charging position, and then flows through the feed groove 63 into the reservoir chamber 61, and through the passage 25 into the pressure reservoir 24 of the double chamber reservoir 23. At the same time pressure flows from the passage 25 through the passage 78 into the exhaust piston chamber 74 and charges this chamber to the same pressure that is in the pressure reservoir 24 and pressure reservoir chamber 61. The upward movement of the piston 62 also moves the valve 65 upwardly until it engages its seat in the seating member 67 and closes the passage 36 between the pressure reservoir chamber 61 and the application chamber passage 34ª. When the piston 62 is moved upwardly to open the feed groove 63, the valve 65 is closed, and further upward movement of the piston 62 causes the plunger 79 to be moved upwardly through its guideway in the valve 65 and caused to engage the intermediate exhaust valve stem 75 and thereby unseat this valve and hold it open to establish communication between the application chamber passage 34ª and the automatic exhaust passage 33ª.

*Charging of independent brake valve.*

The upper chamber 46 of the independent brake valve 32 is constantly supplied with reduced main reservoir pressure through main reservoir pipe 13, branch pipe 37, in which is located a reducing valve 38, passage 37ᵇ which opens into the chamber 46.

*Running position.*

In the running position of the independent brake valve, as shown in Figs. 10 and 14, the small exhaust cavity 54 is in register with the port 33ᵇ in the valve seat.

*Automatic service application of the brakes.*

When a reduction of pressure occurs in the brake pipe 12, a similar reduction is caused in the chamber 60 of the equalizing portion of the distributing valve, and the pressure in the pressure reservoir chamber 61 forces the piston 62 down past the feed port 63, thereby placing the chambers 61 and 60 out of communication. The downward movement of piston 62 continues until the buffer 103 bears against the cap of the graduating spring 105. This downward movement of the piston also causes the pin 69 in the piston stem 64 to pull the supply valve 65 from its seat and open the port 36. Air from the pressure reservoir 24 of the double chamber reservoir 23 is then free to flow through passage 25, chamber 61, port 36, into passage 34ª. One end of the application chamber passage 34ª communicates with the control chamber 26 of the double chamber reservoir and the other end with the application chamber 35. The control chamber 26 of the double chamber reservoir is for the sole purpose of supplying volume to the application chamber 35. The movement of the piston 62 downward also permits the exhaust piston 73 to move down and cause its stem 75 to close the intermediate exhaust port 71 between the application chamber passage 34ª and the automatic exhaust passage 33ª.

When the pressure has thus entered application chamber 35, it forces application piston 80 downward and causes its stem 81 to engage first with the fluted stem of the preliminary supply valve 88 forcing it from its seat and further downward movement of the piston 80 causes its stem to engage the stem 84 of the main supply valve 85 and force it from its seat. Opening the supply valves 85 and 88 permits main reservoir pressure to flow into the brake cylinders on the locomotive to a pressure slightly greater than the pressure in the application chamber 35 through the following circuit: main reservoir pipe 13, branch pipe 39, passage 39ª, chamber 83, supply port 106, passage 31ª, brake cylinder pipes 31 and 30 and into the brake cylinders 28 and 29. At the same time the pressure in chamber 99 below the application piston 80 is charged to a pressure equal to the pressure in the brake cylinder passage 31ª through the port 82, and therefore when the pressures in the brake cylinder passage 31ª and chamber 99 are slightly in excess of the pressure chamber 35, the application piston 80 is forced upward, the movement allowing the supply valves 85 and 88 to seat and cut off further flow of main reservoir pressure into the brake cylinders on the locomotive.

The reduction of the brake pipe pressure which causes the distributing valve to make an automatic application of the locomotive brakes will also cause the triple valves on the cars to make an automatic application of the brakes on the train and cause the train brakes to apply in unison with the brakes on the locomotive.

When the pressure in the pressure reservoir chamber 61 becomes slightly less than the pressure in chamber 60, the equalizing piston 62 moves up until the supply valve 65 closes the supply port 36 but the piston does not travel far enough to open the intermediate exhaust port 71 or the feed groove 63. This lap position of the equalizing portion of the distributing valve is shown in Fig. 2.

*Brake cylinder maintaining action of the distributing valve.*

Should any leakage occur from the brake cylinders 28 and 29 on the locomotive or through the brake cylinder pipe connections, it would cause a reduction in pressure in brake cylinder passage 31ª and chamber 99, and thereby cause the pressure in application chamber 35 to again force the application piston 80 downward until its stem 81 unseats the preliminary supply valve 88 and thereby permit main reservoir pressure to again flow into the brake cylinder passage 31ª and again build up the pressure in the brake cylinders on the locomotive to an amount slightly in excess of the pressure in the application chamber 35 when the piston 80 will again be raised, thereby permitting the preliminary supply valve to again close and shut off any further flow of main reservoir pressure into the brake cylinder passage 31ª.

*Automatic release of the locomotive brakes.*

The independent brake valve being in running position, and the equalizing portion of the distributing valve being in lap position, as shown in Fig. 2, then when main reservoir pressure is allowed to flow through the engineer's automatic brake valve 10 to recharge the brake pipe 12, and the pressure in the brake pipe chamber 60 becomes slightly greater than the pressure in the chamber 61, it forces the equalizing piston 62 upward. This upward movement of the equalizing piston 62 causes the plunger 79 to engage and unseat the stem 75 of the piston 73 thereby opening the intermediate exhaust port 71. At the same time that this exhaust port 71 is uncovered the feed groove 63 is opened and pressure is permitted to flow from chamber 60 through the feed groove 63 and into chamber 61 and through passage 25 into the pressure reservoir 26 of the double chamber reservoir 23, thereby recharging the pressure reservoir 26 to brake pipe pressure. At the same time pressure from the pressure reservoir chamber 61 flows through the passage 78 into the exhaust piston chamber 74 thereby charging this chamber also to brake pipe pressure.

With the equalizing piston 62 in its recharging and release position and the exhaust valve 75 open, air from the application chamber 35 and the check valve chamber 95 flows through application chamber passages 34ª, intermediate exhaust port 71, automatic exhaust passage 33ª, into pipe 33, and thence through the port 33ᵇ in the independent brake valve seat, into the small exhaust cavity 54 and through the main exhaust outlet 47 directly to the atmosphere.

When the pressure is thus exhausted from the application chamber 35 and the check valve chamber 95, it permits the release of brake cylinder pressure on the locomotive in the following manner: the pressure in brake cylinders 28 and 29 flows through brake cylinder pipes 30 and 31, brake cylinder pipe passage 31ª, through by-pass 94, thereby lifting the check valve 92 and opening port 96, which permits the air to flow through port 96 into check valve chamber 95, passage 98 into application chamber passage 34ª, through intermediate exhaust port 71 into automatic exhaust passage 33ª and thence through automatic exhaust pipe 33, port 33ᵇ, small exhaust cavity 54 and into the main exhaust passage 47 into the atmosphere. The pressure in chamber 99 on the underside of the application piston 80 exhausts simultaneously with the pressure in brake cylinder passage 31ª. The charging of the brake pipe 12 causes the triple valves on the cars to release and thereby causes the train and locomotive brakes to be released in unison.

*Independent application of the locomotive brakes.*

When the handle of the independent brake valve is placed in application position, the supply port 55 extending through the rotary valve is in register with the brake cylinder port 31ᵇ in the seat of the valve which permits reduced main reservoir pressure which is constantly present in chamber 46 to flow through these ports into the brake cylinder pipes 31 and 30 directly into the brake cylinders 28 and 29 and apply the brakes on the locomotive to the amount which may be desired which may be of any amount up to the pressure at which the reducing valve 38 is set. At the same time that pressure is flowing into the brake cylinders, it flows from pipe 31 into brake cylinder passage 31ª, through by-pass 94, to the under side of the check valve 92, lifting this valve and flowing through check valve chamber 95, passage 98, into application chamber 35, and through application chamber passage 34ª into the control chamber 24 of the double chamber reservoir 23. When the independent brake valve is in application or lap position, the exhaust ports 33ᵇ and 34ᵇ are both closed by the rotary valve and hence the main exhaust port 47 is closed. When the check valve chamber 95 is charged equal to the pressure in the brake cylinders, the check valve 92 automatically closes and traps the air in the application chamber 35 above the application piston 80, thereby placing in operation the brake cylinder pressure maintaining feature, as previously described.

It will be noted that by this construction, the engineer is enabled to not only make a direct application of the locomotive brakes but this operation also puts in operation the automatic brake cylinder pressure maintaining feature of the distributing valve, this being one of the unique features of the present invention as compared with air brake systems in common use.

*Normal automatic release of locomotive brakes after independent application.*

When the equalizing portion of the distributing valve is in its release position, the locomotive brakes may be released either in the normal automatic manner or virtually instantaneously, according to whether or not the independent brake valve it put in its running or quick release position.

When the equalizing portion of the automatic distributing valve is in its release position and the independent brake valve is placed in its running position, the pressure in the brake cylinders is exhausted through the automatic distributing valve in the manner previously described with reference to the automatic release of the locomotive brakes.

Independent quick release of the locomotive brakes.

To effect an independent quick release of the locomotive brakes, the handle of the independent brake valve is placed in its quick release position, in which the large cavity 53 of the rotary valve 49 is in register with the port 31$^b$, thereby permitting brake cylinder pressure to exhaust directly to the atmosphere through brake pipes 30 and 31, port 31$^b$, large cavity 53, and into the exhaust port 47. At the same time the small exhaust cavity 54 of the rotary valve is in register with the port 34$^b$ and the pressure in the application chamber 35 is exhausted directly to the atmosphere through passage 34$^a$, pipe 34, port 34$^b$, cavity 54 and exhaust passage 47. In t is position of the independent brake valve, therefore, both the brake cylinders and the application chamber 35 are directly exhausted to the atmosphere regardless of the position of the equalizing portion of the distributing valve, this being another unique feature of the present invention as compared with air brake systems in common use.

Graduated release of locomotive brakes.

When the equalizing portion 20 of the automatic distributing valve is in release position as shown in Fig. 17, a graduated release of the locomotive brakes may be effected by moving the handle of the independent brake valve back and forth between its running position shown in Fig. 10, and its lap position shown in Fig. 11, thereby gradually exhausting the locomotive brakes through the distributing valve as described. If the equalizing portion of the automatic distributing valve is in its lap position, as shown in Fig. 2, in which the intermediate exhaust valve 75 is closed, a graduated release may be effected by moving the handle of the independent brake valve back and forth between its running position, shown in Fig. 10, and its quick release position, shown in Fig. 9, thereby gradually exhausting the brake cylinder pressure directly from the brake cylinders to the atmosphere.

Holding position.

When it is desired to hold the locomotive brakes and release the train brakes, the handle of the independent brake valve is moved to its lap position, in which the supply port and cavities of the rotary valve are out of communication with all of the ports in the valve seat. Inasmuch as the brake cylinder pressure is at all times released through the independent brake valve, it follows that placing this independent brake valve in lap position completely prevents the exhaust of pressure from the locomotive brake cylinders regardless of the operation of the engineer's automatic brake valve.

Tire protecting valve.

The prevention of an undesired service application of the locomotive brakes is effected by means which preferably are constructed as follows:

The numeral 108 represents the casing of a tire protecting valve which is connected at its upper end by a pipe 109 with a channel (not shown) in the engineer's automatic brake valve 10, which channel, during the release and running position of the engineer's automatic brake valve, is charged with main reservoir pressure. At its lower end this tire protecting valve is connected by a pipe 110 with the application chamber pipe 34, which latter is in constant communication with the application chamber 35 of the automatic distributing valve. At its upper end this tire protecting valve is connected by a pipe 111 with a pipe 112 which is connected with the distributing valve casing 100 and this pipe 111 is also connected to a check valve 113, this check valve also being connected by a pipe 114 with the brake cylinder pipe 30.

A piston chamber is provided in the upper part of the tire protecting valve casing 108 and in this chamber is arranged a piston 115 which forms two chambers 116 and 117 on its opposite sides. In the chamber 117 there is a vent port 146 which leads directly to the atmosphere. For the purpose of controlling the flow of pressure through the port 140, the piston is provided with a valve stem 118 movably arranged in a passage 119 at the outer end of which a valve seat 141 is provided. The port 140 communicates with the pipe 109. Below this piston 115 the tire protecting valve casing is formed to provide a chamber 120 and a chamber 121, these two chambers being separated by a flexible diaphragm 122. The upper diaphragm chamber 120 is connected by a passage 123 with the passage 119 and is also vented to the atmosphere through a restricted vent 124. When the piston 115 is moved toward the pipe 109, its valve stem 118 is seated against its seat 141 and thereby closes the port 140 and cuts off communication between this passage 123 and the pipe 109.

At its lower end the tire protecting valve, is provided with a chamber 125 which communicates with the pipe 110. An exhaust port 126 extends between the chamber 125 and the lower diaphragm chamber 121 and in this port is arranged an exhaust valve 127 which seats in a seating member 128 and is provided with a fluted stem 129 which extends upwardly into the lower diaphragm chamber 121. The diaphragm 122 is provided on its underside with a stem 131 which engages with the stem 129 of the exhaust valve 127, and in the normal depressed position of the diaphragm holds the exhaust valve 127 in its opened position. When the pressure in chamber 121 is vented, a spring 130 causes the exhaust valve to be held against its seat. The lower diaphragm chamber 121 is vented to the atmosphere by a plurality of vents 132 in the side of the casing. The chamber 116 on one side of the piston 115 opens into a passage connected with a pipe 111 which pipe is connected to the check valve 113. This check valve comprises a valve member 133 which is yieldingly held in its seated position by a spring 134 and in this check valve a restricted passage 135 is provided. The opposite side of the check valve 113 is connected to the brake cylinder pipe 30 by the pipe 114. Between the check valve 113 and the tire protecting valve a pipe 112 connects with the pipe 111 and at its opposite end with a passage 138, Fig. 2, which leads to the pressure reservoir chamber 61 of the distributing valve. In this passage is arranged a check valve 137 which is held to its seat by a spring 139. On the inner side of this check valve a stem 136 is provided which extends into the pressure reservoir chamber 61. The outer end of the stem of the equalizing piston 62 is enlarged to form an outwardly flaring wedging portion 135.

When the brake pipe pressure in chamber 60 is reduced sufficiently to cause the piston 62 to move down to its full service or emergency position, the wedge shaped projection on the stem 64 of the piston 62 engages with the stem of the check valve 137 and causes this valve to be forced from its seat, thereby permitting pressure to flow from the pressure reservoir chamber 61 through pipes 112 and 111 to chamber 116 which causes the piston 115 to be moved over until its stem 118 closes the port 140 and shuts off the flow of main reservoir pressure from pipe 109 into chamber 120, and as the pressure is instantly vented to the atmosphere via vent port 124, this allows the spring 130 to force the exhaust valve 127 to its seat and thereby prevent the exhaust of pressure from the chamber 125. This permits the pressure in the application chamber 35 to operate the piston 80 in the usual way.

The purpose of the tire protecting valve is to prevent an undesired application of the locomotive brakes. As will be noted, chamber 125 through pipe connection 110 connects with the application chamber pipe 34 and is thereby in constant communication with the application chamber 35. The exhaust valve 127 in the tire protecting valve, in the normal running and release position of the engineer's automatic brake valve, is held off its seat by the pressure which flows from the engineer's automatic brake valve into the chamber 120 above the diaphragm 122. Therefore, during the running and release position of the engineer's automatic brake valve, the application chamber 35 of the distributing valve is always vented through the application chamber passage 34ᵃ, pipe 34, pipe 110, chamber 125, past the vent valve 127 into the lower diaphragm chamber 121, and thence through the vent passages 132 to the atmosphere, except as hereinafter explained.

Should the engineman overcharge the brake pipe 12, the brake pipe chamber 60, the pressure reservoir chamber 61, and the chamber 24 of the double chamber reservoir are similarly overcharged. When the engineman then moves the engineer's automatic brake valve back to running position, since the pressure in the brake pipe is higher than the pressure at which the feed valve in the engineer's automatic brake valve is set, the pressure in the brake pipe 12 and chamber 60 flows down the brake pipe in the train, thereby causing a reduction in the pressure in the brake pipe chamber 60. This reduction of pressure in the chamber 60 causes the equalizing piston 62 to be depressed to its service position by the overcharged pressure in the pressure reservoir chamber 61, and this action thereby unseats supply valve 65 and permits air to flow from the pressure reservoir chamber 61 through the port 36 and into application chamber passage 34ᵃ. Without the provision of the tire protecting valve, this pressure would flow into the application chamber 35 and depress the application piston 80 to open the supply valve 85 and admit main reservoir pressure from the passage 39ᵃ to the brake cylinder passage 31ᵃ and thereby apply the locomotive brakes. Inasmuch, however, as the application chamber pipe 34 is continuously vented to the atmosphere when the engineer's automatic brake valve is in release or running position, except as hereinafter explained, this pressure instead of applying the locomotive brakes, passes through the application chamber passage 34ᵃ, pipes 34 and 110, chamber 125, passage 126, chamber 121, and vents 132, to the atmosphere, thereby preventing the operation of the application piston 80 in the distributing valve. But should the brake pipe pressure be reduced by reason of the conductor on the train opening a conductor's valve or an angle cock, or should the brake pipe in the train become parted, the equalizing piston 62 would then move down to its full service or emergency position which would cause the wedge shaped projection 165 on the stem 64 to force the valve 137 from its seat and thereby permit the pressure from the pressure reservoir 24 of the double chamber reservoir to flow through passage 135 and into pipe 112, and thence into chamber 116 against the piston valve 115, causing it to move over until its valve stem 118 closes the port 140 and shuts off the flow of main reservoir pressure from the engineer's automatic brake valve into the chamber 120 above the diaphragm 122. The pressure in chamber 120 will then be instantly vented to the atmosphere through the vent port 124, thereby permitting the spring 130 to drive the vent valve 127 to its seat and prevent the pressure from escaping from the application chamber 35 of the distributing valve, which permits the application piston 80 to operate in its usual manner in applying the locomotive brakes.

Inasmuch as pressure flows from the engineer's automatic brake valve through the pipe 109 and into the tire protecting valve only when the engineer's automatic brake valve is in release or running position, it follows that when an automatic application of the brakes is made by the engineer's automatic brake valve the flow of pressure into the chamber 120 of the tire protecting valve is cut off, the exhaust valve 127 thereby closes, and the venting of the application chamber 35 thereby prevented. The automatic distributing valve thereupon functions in its normal manner to make an automatic application of the locomotive brakes as described under the caption "automatic service application of the brakes".

The small vent passage 135 in the check valve 113 is for the purpose of allowing the pressure in the chamber 116 to flow back into the brake cylinders after the brakes have been released. This permits the piston 115 to move back to its normal position and permit main reservoir pressure to flow from the automatic brake valve into the chamber 120 and thereby reopen the exhaust valve 127.

When a direct independent application of the locomotive brakes is made, pressure flows through the independent brake valve to the brake cylinders. At the same time pressure flows from the brake cylinder pipe 30 through pipe 114, lifting check valve 113 and passing through pipe 111 into chamber 116 of the tire protecting valve. This pressure then acting on piston 115 causes its stem 118 to seat and close port 140, thereby cutting off the flow of pressure from the engineer's automatic brake valve into the chamber 120, the air in this chamber exhausts through the small vent 124 and the diaphragm 122 raises and permits the spring 130 to seat the vent valve 127. By this means the application chamber 35 of the distributing valve is cut off from communication with the atmosphere when an independent application of the brakes is made and the brake cylinder pressure maintaining feature of the distributing valve functions in the usual manner previously described.

From the foregoing explanation of the multiple control locomotive brake equipment, it will be readily seen that this air brake system is free from dangerous and costly complication; it is positive in its action; it embodies all the functions desired in modern air brake systems; it is relatively simple in construction and operation considering the function it performs, and is correspondingly less expensive to install and maintain. Furthermore, by the provision of my tire protecting valve an undesired application of the locomotive brakes is prevented.

I claim as my invention:

1. An air brake system comprising means for supplying compressed air, a main reservoir for storing compressed air, an engineer's automatic brake valve connected with said main reservoir, a brake pipe connected with said engineer's automatic brake valve, an automatic distributing valve, a brake cylinder, and an independent brake valve operatively associated with said main reservoir, brake cylinder, and automatic distributing valve, said elements being so organized that in one position of said independent brake valve, the pressure in said brake cylinder is permitted to exhaust directly to the atmosphere through one passage in said independent brake valve while the pressure in said automatic distributing valve is being exhausted directly to the atmosphere through another passage provided in said independent brake valve.

2. An air brake system comprising means for supplying compressed air, a main reservoir for storing said compressed air, an engineer's automatic brake valve connected with said main reservoir, a brake pipe connected with said engineer's automatic brake valve, a brake cylinder, an automatic distributing valve, and an independent brake valve operatively associated with said main reservoir, brake cylinder, and automatic distributing valve, said elements being so organized that in one position of said independent brake valve, pressure will flow from said main reservoir into said brake cylinder, while in another position of said independent brake valve the pressure in said brake cylinder is permitted to exhaust directly to the atmosphere through a relatively large passage provided in said independent brake valve while the pressure in said automatic distributing valve is being exhausted directly to the atmosphere through a smaller passage provided in said independent brake valve.

3. An air brake system comprising means for supplying compressed air, a main reservoir for storing said compressed air, an engineer's automatic brake valve connected with said reservoid, a brake pipe connected with said engineer's automatic brake valve, a brake cylinder, an automatic distributing valve, and an independent brake valve having an exhaust passage adapted to exhaust directly to the atmosphere, and said independent brake valve being operatively associated with said main reservoir, brake cylinder and automatic distributing valve, said elements being so organized that in one position of said independent brake valve pressure will flow from said main reservoir into said brake cylinder and into said automatic distributing valve and be retained therein, while in another position of said independent brake valve the pressure in said brake cylinder and from said distributing valve is exhausted directly to the atmosphere through the exhaust passage provided in said independent brake valve.

4. An air brake system comprising means for supplying compressed air, a main reservoir for storing said compressed air, an engineer's automatic brake valve connected with said reservoir, a brake pipe connected with said engineer's automatic brake valve, a brake cylinder, an automatic distributing valve, an independent brake valve having a large exhaust passage and a small exhaust passage both of which are adapted to exhaust directly to the atmosphere and said independent brake valve being operatively associated with said main reservoir, brake cylinder and automatic distributing valve, said elements being so organized that in one position of said independent brake valve pressure will flow from said main reservoir into said brake cylinder and into said automatic distributing valve and be retained therein, while in another position of said independent brake valve the pressure in said brake cylinder and from said distributing valve is exhausted directly to the atmosphere through the smaller exhaust cavity provided in the independent brake valve, while in another position of independent brake valve pressure from said brake cylinder will exhaust directly to the atmosphere through the large exhaust cavity in said independent brake valve.

5. An air brake system comprising means for supplying compressed air, a main reservoir for storing compressed air, an engineer's automatic brake valve connected with said main reservoir, a brake pipe connected with said engineer's automatic brake valve, a brake cylinder, a double chamber reservoir, an automatic distributing valve mechanism including an application piston and an application chamber, and an independent brake valve mechanism operatively associated with said main reservoir, brake cylinder, double chamber reservoir and automatic distributing valve mechanism, said elements being so organized that in one position of said independent brake valve pressure will flow from said main reservoir into said brake cylinder and into one chamber of said double chamber reservoir and be retained therein, while in another position of said independent brake valve the pressure in said brake cylinder is permitted to exhaust directly to the atmosphere through a large passage in said independent brake valve while the pressure in one chamber of the double chamber reservoir and the application chamber of the automatic distributing valve is being exhausted directly to the atmosphere through a smaller port provided in said independent brake valve.

6. An air brake system comprising means for supplying compressed air, a main reservoir for storing compressed air, an engineer's automatic brake valve connected with said main reservoir, a brake pipe connected with said engineer's automatic brake valve, a brake cylinder, an automatic distributing valve and an independent brake valve operatively associated with said main reservoir, brake cylinder and automatic distributing valve, said elements being so organized that the exhaust of pressure from said brake cylinder is made directly through said independent brake valve during the independent release of the brakes and said exhaust of brake cylinder pressure is made through said automatic distributing valve and direct to the atmosphere through said independent brake valve during the automatic release of the brakes.

7. An air brake system comprising means for supplying compressed air, a main reservoir for storing compressed air, an engineer's automatic brake valve connected with said main reservoir, a brake pipe connected with said engineer's automatic brake valve, a brake cylinder, an automatic distributing valve, a double chamber reservoir, and an independent brake valve operatively associated with said main reservoir, brake cylinder, automatic distributing valve and double chamber reservoir, said independent brake valve being so organized that the exhaust from said brake cylinder is made directly through said independent brake valve during independent release of the brakes and said exhaust of brake cylinder pressure is made through the automatic distributing valve mechanism and direct to the atmosphere through the independent brake valve during the automatic release of the brakes.

8. An air brake system comprising means for supplying compressed air, a main reservoir for storing compressed air, an engineer's automatic brake valve connected with said main reservoir, a brake pipe connected with said engineer's automatic brake valve, an automatic distributing valve, and an independent brake valve, said elements being operatively associated and so organized that in one position of said independent brake valve pressure will be exhausted directly from said brake cylinder to the atmosphere through the same ports and passages in said independent brake valve through which the pressure in said automatic distributing valve is exhausted.

9. An air brake system having means for supplying compressed air, a main reservoir for storing compressed air, a brake cylinder, a brake pipe, an engineer's automatic brake valve connected with said main reservoir and with said brake pipe, an independent brake valve, a double chamber reservoir, an automatic distributing valve having an equalizing portion and an application and brake cylinder pressure maintaining portion, said application and maintaining portion including a brake cylinder passage, an application chamber, and a main reservoir pressure passage, a by-pass connecting said brake cylinder passage and said application chamber, a check valve preventing the flow of pressure from said application chamber through said by-pass to said brake cylinder passage, and a supply valve between said main reservoir pressure passage and said brake cylinder passage, said supply valve being operable through motion derived from said application piston.

10. An air brake system having means for supplying compressed air, a main reservoir for storing compressed air, a brake cylinder, a brake pipe, an engineer's automatic brake valve connected with said main reservoir and with said brake pipe, an independent brake valve, a double chamber reservoir, an automatic distributing valve having an equalizing portion and an application and brake cylinder pressure maintaining portion, said application and maintaining portion including a main reservoir pressure passage, a brake cylinder passage, an application chamber, a check valve chamber arranged above said application chamber, a passage connecting said application chamber and check valve chamber, a by-pass connecting said brake cylinder passage and said check valve chamber, a check valve arranged in said check valve chamber and preventing the flow of pressure from said application chamber through said check valve chamber, and into said by-pass, and a supply valve between said main reservoir pressure passage and said brake cylinder passage, said supply valve being operable through motion derived from said application piston.

11. An air brake system comprising means for supplying compressed air, a main reservoir for storing compressed air, an engineer's automatic brake valve connected with said reservoir, a brake pipe connected with said engineer's automatic brake valve, a brake cylinder, a double chamber reservoir, an automatic distributing valve having an application piston, an application chamber above said application piston, an independent brake valve having an exhaust passage adapted to be connected with the atmosphere, said independent brake valve also having a brake cylinder exhaust port and an application chamber exhaust port, pipe means connecting said brake cylinder exhaust port with said brake cylinder, and also with the under side of said application piston, and pipe means connecting said application chamber port with said application chamber, said independent brake valve being so organized that in one position said brake cylinder port and said application chamber port are simultaneously directly connected to said exhaust port.

12. An air brake system comprising means for supplying compressed air, a main reservoir for storing compressed air, an engineer's automatic brake valve connected with said reservoir, a brake pipe connected with said engineer's automatic brake valve, a brake cylinder, a double chamber reservoir, an automatic distributing valve having an application piston, an application chamber above said application piston, an independent brake valve having an exhaust passage adapted to be connected with the atmosphere, said independent brake valve also having a brake cylinder port and an application chamber port, pipe means connecting said brake cylinder port with said brake cylinder and also with the under side of said application piston, and pipe means connecting said application chamber port with said application chamber, said independent brake valve being so organized that in one position said brake cylinder port and said application chamber port are simultaneously directly connected to said exhaust port, and in another position said brake cylinder port is connected with said main reservoir.

13. An air brake system comprising means for supplying compressed air, a main reservoir for storing compressed air, a brake cylinder, an engineer's automatic brake valve connected with said main reservoir, a brake pipe connected with said engineer's automatic brake valve, an automatic distributing valve, and an engineer's independent brake valve operatively associated with said main reservoir, brake cylinder, and automatic distributing valve, said independent brake valve having an exhaust port and passage, said elements being so organized that upon an automatic application of the brakes and upon moving said engineer's automatic brake valve to lap position, said independent brake valve is adapted to be moved to a position in which the locomotive brake cylinder pressure is directly exhausted to the atmosphere through said exhaust port of said independent brake valve while the train brakes are held applied by the engineer's automatic brake valve.

14. An air brake system comprising means for supplying compressed air, a main reservoir for storing compressed air, a brake cylinder, an engineer's automatic brake valve connected with said main reservoir, a brake pipe connected with said engineer's automatic brake valve, an automatic distributing valve and an engineer's independent brake valve operatively associated with said main reservoir, brake cylinder, and automatic distributing valve, said independent brake valve having a main exhaust outlet, and said elements being so organized that upon moving said independent brake valve to running position, locomotive brake cylinder pressure will be exhausted through said automatic distributing valve and direct to the atmosphere through said exhaust port in said independent brake valve, and upon moving said independent brake valve back and forth between said running position and its lap position, a graduated release of the locomotive brakes is effected.

15. An air brake system comprising means for supplying compressed air, a main reservoir for storing compressed air, a brake cylinder, an engineer's automatic brake valve connected with said main reservoir, a brake pipe connected with said engineer's automatic brake valve, an automatic distributing valve and an engineer's independent brake valve operatively associated with said main reservoir, brake cylinder, and automatic distributing valve, said independent brake valve having a main exhaust outlet, a port connected with said brake cylinder and a port connected with said automatic distributing valve, said elements being so organized that while the train brakes are being held applied by the engineer's automatic brake valve, upon moving said independent brake valve to quick release position said ports are connected with said main exhaust outlet and the pressure in said brake cylinder and automatic distributing valve thereby directly exhausted to the atmosphere, and upon moving said independent brake valve back and forth between its quick release and running position a graduated independent release of the locomotive brakes is effected while the train brakes are held applied by the engineer's automatic brake valve.

16. An air brake system comprising means for supplying compressed air, a main reservoir for storing compressed air, an engineer's automatic brake valve connected with said main reservoir, a brake pipe connected with said engineer's automatic brake valve, an automatic distributing valve having an application chamber, a brake cylinder, an independent brake valve operatively associated with said main reservoir, brake cylinder, and automatic distributing valve, and a tire protecting valve operatively connected with said engineer's automatic brake valve, said automatic distributing valve and said brake cylinder, said elements being so organized that during the normal running and release operation of said engineer's automatic brake valve, said application chamber is vented to the atmosphere through said tire protecting valve.

17. An air brake system comprising means for supplying compressed air, a main reservoir for storing compressed air, an engineer's automatic brake valve connected with said main reservoir, a brake pipe connected with said engineer's automatic brake valve, an automatic distributing valve having an application chamber, a brake cylinder, an independent brake valve operatively associated with said main reservoir, brake cylinder, and automatic distributing valve, and a tire protecting valve operatively connected with said engineer's automatic brake valve, said automatic distributing valve and said brake cylinder, said elements being so organized that during the normal running and release operation of said engineer's automatic brake valve, said application chamber is vented to the atmosphere through said tire protecting valve, and during an independent application of the locomotive brakes said tire protecting valve is actuated to cut off the flow of pressure from the application chamber to the atmosphere.

18. An air brake system comprising means for supplying compressed air, a main reservoir for storing compressed air, an engineer's automatic brake valve connected with said main reservoir, a brake pipe connected with said engineer's automatic brake valve, an automatic distributing valve having an application chamber, a brake cylinder, an independent brake valve operatively associated with said main reservoir, brake cylinder, and automatic distributing valve, and a tire protecting valve operatively connected with said engineer's automatic brake valve, said automatic distributing valve and said brake cylinder, said elements being so organized that during the normal running and release operation of said engineer's automatic brake valve, said application chamber is vented to the atmosphere through said tire protecting valve, and during a full service application and an emergency automatic application of the brakes, said tire protecting valve is actuated to cut off the flow of pressure from said application chamber to the atmosphere.

19. An air brake system comprising means for supplying compressed air, a main reservoir for storing compressed air, an engineer's automatic brake valve connected with said main reservoir, a brake pipe connected with said engineer's automatic brake valve, an automatic distributing valve having an application chamber, a brake cylinder, an independent brake valve operatively associated with said main reservoir, brake cylinder, and automatic distributing valve, and a tire protecting valve operatively connected with said engineer's automatic brake valve, said automatic distributing valve and said brake cylinder, said elements being so organized that during the normal running and release operation of said engineer's automatic brake valve, said application chamber is vented to the atmosphere through said tire protecting valve, and when said engineer's automatic brake valve is moved from running or release position to lap, service or emergency position, said tire protecting valve is actuated to cut off the flow of pressure from the application chamber to the atmosphere.

20. An air brake system comprising means for supplying compressed air, a main reservoir for storing compressed air, an engineer's automatic brake valve connected with said main reservoir and having a passage charged with main reservoir pressure during the release and running position thereof and cut off during the lap, service and emergency positions thereof, a brake pipe connected with said engineer's automatic brake valve, an automatic distributing valve having an application chamber, a brake cylinder, an independent brake valve operatively associated with said main reservoir, brake cylinder, and automatic distributing valve, a tire protecting valve, pipe means connecting said tire protecting valve with said engineer's automatic brake valve, with said automatic distributing valve, and with said brake cylinder, said tire protecting valve containing a vent valve adapted in its open position to vent said application chamber, means operable through pressure derived from said passage in said engineer's automatic brake valve for holding said vent valve open when said engineer's automatic brake valve is in release and running position, means for closing said vent valve when said engineer's automatic brake valve is in lap, service or emergency position, and means operable through pressure derived from said brake cylinder for preventing the flow of pressure from said engineer's automatic brake valve to said tire protecting valve to close said vent valve.

21. An air brake system comprising means for supplying compressed air, a main reservoir for storing compressed air, an engineer's automatic brake valve connected with said main reservoir and having a passage charged with main reservoir pressure during the release and running position thereof, and cut off during the lap, service and emergency positions thereof, a brake pipe connected with said engineer's automatic brake valve, an automatic distributing valve having an application chamber, a brake cylinder, an independent brake valve operatively associated with said main reservoir, brake cylinder, and automatic distributing valve, a tire protecting valve, pipe means connecting said tire protecting valve with said engineer's automatic brake valve, with said automatic distributing valve, and with said brake cylinder, said tire protecting valve containing a vent valve adapted in its open position to vent said application chamber, means operable through pressure derived from said passage in said engineer's automatic brake valve for holding said vent valve open when said engineer's automatic brake valve is in release and running position, means for closing said valve when said engineer's automatic brake valve is in lap, service or emergency position, and means operable through pressure derived from said automatic distributing valve for preventing the flow of pressure from said automatic brake valve to close said vent valve when said automatic distributing valve is moved to full service position and to emergency position.

22. An air brake system comprising means for supplying compressed air, a main reservoir for storing compressed air, an engineer's automatic brake valve connected with said main reservoir and having a passage charged with main reservoir pressure during the release and running position thereof, and cut off during the lap, emergency and service positions thereof, a brake pipe connected with said engineer's automatic brake valve, an automatic distributing valve having an equalizing portion and an application and brake cylinder pressure maintaining portion, said equalizing portion including a piston actuated by a differential brake pipe pressure and said application and maintaining portion having an application chamber, a brake cylinder, an independent brake valve operatively associated with said main reservoir, brake cylinder and automatic distributing valve, a tire protecting valve having a vent valve, pipe means connecting said vent valve with said application chamber whereby in the open position of said vent valve said application chamber is vented, a diaphragm adapted to hold said vent valve in open position, said diaphragm forming one side of a pressure chamber, pipe means for connecting said pressure chamber with said main reservoir pressure passage in said engineer's automatic brake valve, whereby in the release and running position of said engineer's automatic brake valve said vent valve is held in its open position, a piston arranged in a piston chamber adjacent said pressure chamber, said piston having a valve stem adapted to cut off the flow of pressure from said engineer's automatic brake valve to said pressure chamber, pipe means connecting said piston chamber with said brake cylinder, whereby upon independent application of the locomotive brakes, brake cylinder pressure will move said piston to cut off the flow of pressure from said engineer's automatic brake valve to said pressure chamber, and means for actuating said piston to cut off the flow of air from said engineer's automatic brake valve to said pressure chamber when said equalizing piston of said automatic distributing valve is moved to full service position and to emergency position, comprising a check valve arranged adjacent said equalizing piston, pipe means connecting said last named check valve with the piston chamber in said tire protecting valve, means for opening said last named check valve when said equalizing piston is moved to full service position and to emergency position whereby pressure from said automatic distributing valve is permitted to flow through said last named pipe means and move said piston in said tire protecting valve to cut off the flow of pressure from said engineer's automatic brake valve to said pressure chamber, and a check valve in the pipe means between the brake cylinder and the tire protecting valve, said check valve having a vent port therethrough to permit the backward flow of pressure from the piston chamber to the brake cylinder.

In testimony whereof I hereby affix my signature.

FRANK H. DUKESMITH.